3,166,475
ANTI-CONVULSANT PYRAZOLONES
Fernanda Misani Fiordalisi, 40 Tamaques Way, Westfield, N.J.
No Drawing. Original application Dec. 29, 1959, Ser. No. 862,450, now Patent No. 3,079,397, dated Feb. 27, 1963. Divided and this application Dec. 31, 1962, Ser. No. 248,216
6 Claims. (Cl. 167—65)

This is a division of application Serial No. 862,450, filed December 29, 1959, now U.S. Patent No. 3,079,397.

This invention relates to a method for relieving convulsions and is more particularly concerned with a method for relieving convulsions in animals.

The invention is based on the unexpected finding that certain 4-4-disubstituted pyrazolone compounds, when administered to the animal organism, exhibit anti-convulsant activity.

The pyrazolone nucleus has been known for a long time to exist in three tautomeric structures, and ultraviolet absorption spectra indicate that 1,3-disubstituted 5-pyrazolones may react according to the three following formulae:

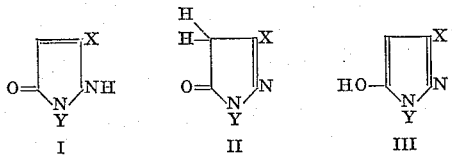

Structure I is present in several substituted pyrazolones which are widely known and used as antipyretic agents. Antipyrine, tolypyrine, aminopyrine, melubrine are some of the most important members of this series. All these compounds are characterized by the presence of a phenyl group attached to the nitrogen atom in the 1-position and a methyl group in the 3-position. The 4-position is usually, but not necessarily, substituted, because for instance it is unsubstituted in antipyrine and tolypyrine. The nitrogen atom in the 2-position is substituted in antipyrine and melubrine, but it is unsubstituted in aminopyrine. Thus while the phenyl group in the 1-position and a methyl group in the 3-position seem to be essential for antipyretic activity, substitution in the 4-position does not appear to be essential.

Several 4,4-dimethyl derivatives, as well as Pyrazole Blue and Tartrazine, are derived from Formula II. The existence of structure III has been invoked to explain the products resulting from methylation with diazomethane or acylation with acid chlorides and alkali, which are C-alkyl and O-aryl derivatives. Several pyrazolone dyes are derived from Structure III.

In spite of the extensive research in the field of pyrazolones no pharmacological or clinical use has ever been reported for any compound derived from structure II, more specifically for compounds containing two substituents in the 4-position. In view of the extensive literature data in the field of pyrazolones and the absence of any physiological activity of the known pyrazolones derived from structure II, it was novel and surprising to find that compounds derived from structure II possess significant value as central depressants and more particularly as anti-convulsants.

The compounds of the invention have the formula:

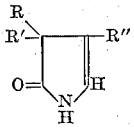

in which R is an alkyl group containing up to four carbon atoms, R' is an aryl group and R" is selected from the group consisting of hydrogen and a low-molecular-weight alkyl group. It is also possible, according to the invention, that R and R' represent the same substituent.

In view of the essential features indicated above, exhibited by compounds having antipyretic activity, that is, a phenyl group on the nitrogen in the 1-position and a methyl group in the 3-position, it was also novel and unforeseeable that the anti-convulsant activity reaches the maximum value in 4-methyl-4-phenyl pyrazolone, that is, a compound which is unsubstituted both on the two nitrogen atoms and in the 3-position.

The anti-convulsant activity of the compounds of this invention may perhaps be explained by the fact that they contain the group

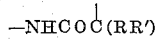

that is, these compounds are structurally related to known hypnotics and central depressants. It is not a mere coincidence that this moiety is found for instance in hydantoins, disubstituted barbiturates, oxazolidinediones, hexahydropyrimidinediones, Noludar and Doriden.

The fact that the two substituents in the 4-position of the pyrazolones of this invention are essential to physiological activity is analogous to the barbiturates where 5-unsubstituted or 5-monosubstituted barbiturates are well known to be devoid of any physiological activity. Although the mechanism of action of the compounds of the invention appears to be analogous to the known central depressants, it is to be understood that the scope of this invention is not limited by theoretical consideration of mode of action on the brain centers, mainly because such a mode of action is still little known or inadequately understood.

Anticonvulsant activity is the ability of a compound to prevent epileptic seizures, that is, convulsions accompanied by loss of consciousness, which are known as "grand mal epilepsy," and also the ability to control the milder attacks not accompanied by convulsions, known as "petit mal."

The process used for the preparation of the compounds of the invention has been described in copending application Serial No. 862,450, filed December 29, 1959, now issued to U.S.P. 3,079,397. The process consisted of the reaction of an α,α-disubsituted ester containing a carbonyl group in the β-position with hydrazine, as represented below:

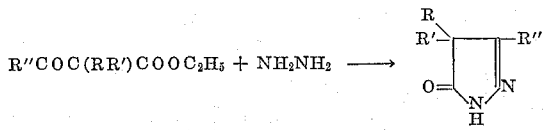

According to this equation, R, R' and R" have the same meaning as indicated above, that is, R and R' may be the same or may be different and may be either an alkyl group containing up to four carbon atoms or an aryl group, and R" may be hydrogen or a low-molecular-weight alkyl group. R and R' may also be the same.

The process described and claimed in Serial No. 862,450 essentially consists of placing molar equivalents of hydrazine and of the ester component, preferably in a solvent, in a flask provided with a Soxhlet extraction apparatus adjusting the pH to 5, and placing a dehydrating agent in the thimble of the Soxhlet extraction apparatus. Calcium oxide and barium oxide are suitable dehydrating agents, but other dehydrating agents, such as magnesium sulfate and calcium sulfate, may be used. The amount of the dehydrating agent should be sufficient to absorb all the water formed in the reaction, but an excess is preferable.

Obviously, any technique, which allows for the removal of water, is satisfactory, although the procedure comprising refluxing in a Soxhlet apparatus with calcium oxide represents the preferred embodiment of the invention. Ethanol is a suitable solvent, but other solvents inert to the reactants may be used.

The method has general application for the synthesis of pyrazolones containing two relatively high-molecular-weight substituents in the 4-position and characterized by the absence of substituents on the two nitrogen atoms.

The following preparations and examples are meant to be illustrative of the process and products of the present invention and are not to be construed as limiting.

PREPARATION I

*3-methyl-4,4-dibutyl-pyrazolone.*—5 g. of ethyl dibutyl aceto-acetate, 3.4 g. of 35% hydrazine hydrate were dissolved in 150 ml. ethanol and the pH was adjusted to about 5 by dropwise addition of acetic acid. The solution was refluxed for about 16 hours in a flask provided with a Soxhlet thimble containing 20 g. of calcium oxide. Then the solution was filtered to remove traces of calcium oxide carried over into the flask, concentrated to about 15 ml. and diluted with an equal volume of water. A crop of 3 g. of product having a melting point of 95– recrystallization from benzene and precipitation with 100° C. was obtained, which was further purified by petroleum ether (B.P. 70–90° C.). The melting point of the pure product was 102–103° C. *Analysis.*—Calcd. for $C_{12}H_{22}N_2O$: C, 68.53; H, 10.54. Found: C, 68.69; H, 10.62.

The substance showed some anti-convulsant activity, but was more toxic than the 4-phenyl-4-methyl compound described below.

PREPARATION II

*4-methyl - 4 - phenyl - 5 - pyrazolone.*—Four and three-tenths of a gram of ethyl α-formyl α-methyl phenyl acetate, 3.6 grams of 85% hydrazine hydrate were dissolved in 300 ml. of absolute ethanol, and the solution was brought to pH 5 by dropwise addition of acetic acid. The solution was placed in a flask provided with a Soxhlet apparatus, and 40 grams of calcium oxide were placed in the thimble. After refluxing for about 17 hours, the solution was filtered, concentrated to about 25 ml. and diluted with an equal volume of water. The crude product, 2.3 grams, recrystallized from heptane and acetone, gave a crop of 1.6 grams of melting point 98–101° C.

Extraction with heptane and concentration of the heptane solution raised the melting point to 99–101° C. *Analysis.*—Calcd. for $C_{10}H_{10}N_2O$: N, 16.08. Found: N, 15.87.

PREPARATION III

*4,4-dimethyl pyrazolone.*—The substance was prepared by heating 4 hours equivalent amounts of hydrazine hydrate and ethyl α-formyl isobutyrate. After cooling, the product was extracted with ether and recrystallized from benzene petroleum ether—M.P. 97°–98°.

Experiment 1.—*Acute toxicity—mice*

The test compounds in 1.5 to 2% solution were administered intraperitoneally in graded doses to a group of mice and the number of deaths recorded. The dose which should kill 50 percent of the animals, that is the $LD_{50}$, was calculated. The results are summarized below.

Test compound: $LD_{50}$, mg./kg.
4,4-dimethyl pyrazolone _____ >900
3-methyl-4,4-dibutyl-pyrazolone _____ 400
4-methyl-4-phenyl pyrazolone _____ 1000

Experiment 2.—*Neurological toxic symptoms*

The procedure was essentially the same as in the previous experiment, except that instead of death, the end point was the development of neurological toxic symptoms in one-half of the experimental group of mice.

Test compounds: $NTD_{50}$ in mg./kg.
4,4-dimethyl pyrazolone.
3-methyl-4,4-dibutyl pyrazolone _____ 500
4-methyl-4-phenyl pyrazolone _____ 187

Experiment 3.—*Anticonvulsant*

A. The test procedure was the electroshock method, that is the drug was administered orally to the mice under test. After one hour the animal was subjected to the direct-current stimulus, about equal to three times the current necessary to produce maximum seizures. The results below give the effective dose in milligrams per kilogram required to prevent convulsions in one-half of the animals tested.

Test compound: $ED_{50}$ in mg./kg.
4,4-dimethyl-pyrazolone _____ >800
3-methyl-4,4-dibutyl pyrazolone _____ 1000
4-methyl-4-phenyl pyrazolone _____ 89

The Protective Index against electroshock of 4-methyl-4-phenyl pyrazolone is $$\frac{NTD_{50}}{ED_{50}}=\frac{187}{89}=2.1$$

that is the substance has a high protective index and is essentially non-toxic, as demonstrated by the high doses required to produce neurological toxic symptoms or to kill one-half of the animals under test.

B. Anticonvulsant activity against metrazole:

Test compound: $ED_{50}$ in mg./kg.
4,4-dimethyl pyrazolone _____ >800
3-methyl-4,4-dibutyl pyrazolone _____ 750
4-methyl-4-phenyl pyrazolone _____ 116

The 3-methyl-4,4-dibutyl pyrazolone gave no evipal potentiation at 125 mg./kg. A slight evipal potentiation was noticed with 4,4-dimethyl pyrazolone at 800 mg./kg.

The above data show that while the 4,4-dimethyl and the 3-methyl-4,4-dibutyl pyrazolone give no protection at a dose of 800 mg./kg., 4-methyl-4-phenyl pyrazolone has a protective index against metrazole of 1.6.

Experiments 4 and 5.—*Analgesic and hypnotic activity*

Test compound: $ED_{50}$
4,4-dimethyl pyrazolone _____ >800
3-methyl-4,4-dibutyl pyrazolone _____ >1000
4-methyl-4-phenyl pyrazolone _____ >500

These data show that the 4,4-disubstituted pyrazolones in direct contrast with 5,5-disubstituted barbituric acids have no hypnotic nor sedative activity. This property is very significant in the field of anticonvulsants, where it may be necessary to continue the use of the drug over an extended period of time, and it is desirable not to interfere with the normal activities of the patient. The anticonvulsant activity of the 4,4-disubstituted pyrazolones still shows a correlation with the structure of the two substituents in position 4 as the barbiturates, the activity being negligible in the case of two low-molecular weight substituents, and being highest with 4-methyl-4-phenyl pyrazolone, which is the closest to phenobarbital.

While the compounds of the present invention may be administered to the animal organism intravenously, and intraperitoneally, it is contemplated that the preferred method of administration will be oral. For oral administration, they may be conveniently administered in the form of essentially pure undiluted compounds, such as in a gelatin capsule. Preferably, for ease of handling, the compounds may be intimately associated with a liquid or solid carrier. Sterile water is the preferred liquid carrier, in the presence of an emulsifier. Solid pharmaceutical carriers such as starch, sugar, talc, aluminum hydroxide, calcium carbonate, and the like may be used to form powders. The powders may be tabletted by means of suitable lubricants such as magnesium stearate, or binders such as gelatin.

The compounds may also be converted into their acid addition salts which are prepared from the free bases in a conventional manner by reacting the free bases with the usual inorganic acids, which include for purposes of illustration but without limitation hydrochloric, hydrobromic, hydriodic, sulfuric, and phosphoric or an organic acid, such as formic, methanesulfonic tartaric, citric succinic, et cetera. If the salts are used, the powders may be tabletted with disintegrating agents such as sodium bicarbonate.

The compounds useful as anticonvulsants according to the present invention may be formed in unit dosages containing predetermined amounts of the useful compounds which may then be administered at regular time intervals to create and maintain effective body levels. Suggested unit dosages of 4-methyl-4-phenyl pyrazolone for larger animals are 25 to 50 mgs. of the active compound per tablet or capsule or a solution containing 25 to 50 mgs. of the useful compound per teaspoon. In the formulations, the percentage of 4-methyl-4-phenyl pyrazolone may vary from 10% up to 50%, the remainder being any of the inert ingredients mentioned above or their combinations. This invention can be embodied in other specific forms without departing from its scope which is to be limited only by the appended claims.

I claim:

1. The method of combating convulsions in animals which comprises administering into the animal dosage units of a pharmaceutically acceptable form of a 4,4-disubstituted pyrazolone of formula

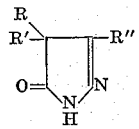

wherein each of R and R' is a member selected from the group consisting of lower alkyl containing between 1 and 4 carbons atoms and phenyl, further characterized by the fact that the sum of carbon atoms of R and R' is greater than 4 and that R may be the same as R' when R and R' total at least eight carbon atoms, and R'' is selected from the group consisting of hydrogen and lower alkyl.

2. The method according to claim 1 wherein said pyrazolone is 4-methyl-4-phenyl pyrazolone.

3. The method according to claim 1 wherein said pyrazolone is 3-methyl-4,4-dibutyl pyrazolone.

4. The method of combating convulsions in animals which comprises orally administering into the animal doses of 25 to 50 mgs. of a pharmaceutically acceptable form of 4-methyl-4-phenyl-5-pyrazolone.

5. An anticonvulsant composition comprising between 10 and 50% of an active compound of the formula

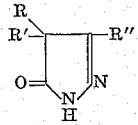

wherein each of R and R' is a member selected from the group consisting of lower alkyl containing between 1 and 4 carbon atoms and phenyl, further characterized by the fact that the sum of carbon atoms of R and R' is greater than 4 and that R may be the same as R' when R and R' total at least eight carbon atoms and R'' is selected from the group consisting of hydrogen and lower alkyl, and the remainder is an inert carrier which is a member selected from the group consisting of talc, aluminum hydroxide, sugar, starch, gelatin, magnesium stearate and combinations thereof.

6. The method of treating an animal suffering from convulsive spasm which comprises administering to said animal a therapeutic dose of 4-methyl-4-phenyl-5-pyrazolone, said dose being less than the neurotoxic dose.

References Cited in the file of this patent
UNITED STATES PATENTS 2,878,263    Oroshnik _____ Mar. 17, 1959

OTHER REFERENCES

Beilsteins, vol. 24, 2nd Supp., p. 80, 1954.

JULIAN S. LEVITT, Primary Examiner.
FRANK CACCIAPAGLIA, Jr., LEWIS GOTTS,
Examiners.